Patented June 11, 1935

2,004,914

UNITED STATES PATENT OFFICE 2,004,914

AMINO DERIVATIVE OF HYDROXY DIPHENYLS

William D. Wolfe, Akron, Ohio, assignor to Wingfoot Corporation, Wilmington, Del., a corporation of Delaware No Drawing. Application December 18, 1930, Serial No. 503,233

9 Claims. (Cl. 260—128)

This invention relates to a new class of organic compounds and it has particular relation to derivatives of hydroxy diphenyl and amino materials.

One object of the invention is to provide materials of the above indicated class which are relatively easy to manufacture by means of simple reactions and which involve the use of relatively inexpensive ingredients. Other objects and advantages will become apparent as the description of the invention proceeds.

Hydroxy diphenyl, a material having the formula

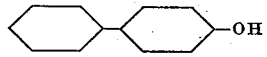

is obtained as a by-product in the manufacture of phenol from chlor benzene (Industrial and Eng. Chem. volume 20, page 114). Heretofore, hydroxy diphenyl has had little or no use in commercial practice.

This invention involves the discovery that this relatively valueless material may readily be caused to react with amino bodies to form materials thought to have the general formula

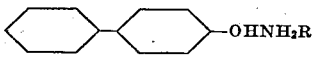

where R is a substituted or unsubstituted hydrocarbon grouping, either aliphatic, aryl or heterocyclic. Some of the materials of this class are found to be valuable in the rubber industry as accelerators of vulcanization or antioxidants or age retarders in rubber compounds.

As a specific example of a material formed by the interaction of hydroxy diphenyl and an amine, attention is called to the derivative of ortho hydroxy diphenyl and ethylene diamine which has the formula $$\begin{array}{l}\text{CH}_2\text{—NH}_2\text{HOC}_6\text{H}_4\text{C}_6\text{H}_5 \\ | \\ \text{CH}_2\text{—NH}_2\text{HOC}_6\text{H}_4\text{C}_6\text{H}_5\end{array}$$

This material is readily prepared in yields of approximately 95 percent of theoretical value merely by intermixing a molar proportion of ethylene diamine with two of ortho hydroxy diphenyl in alcoholic solution at approximately normal room temperatures and atmospheric pressures. Upon the addition of water to this solution, an amber colored oil settles out. This oil, upon being allowed to stand for a short period of time, solidifies into a yellowish solid which may be broken up with ease and which is found to consist of a mass of granular crystals having a melting point of 78° to 80° C.

A corresponding reaction product of ortho hydroxy diphenyl and hexamethylene tetramine may be obtained by adding a molar proportion of hexamethylene tetramine, dissolved in water, to a molar proportion of ortho hydroxy diphenyl dissolved in alcohol. The material may be formed by the addition of formaldehyde to a solution of hydroxy diphenyl in ammoniacal alcohol. The compound readily crystallizes from alcohol in a comparatively high state of purity. The crystals thus formed are clustered together as pure white needles having a melting point of 161 to 162 degrees C. These crystals are soluble in dilute sodium hydroxide but are insoluble in cold dilute hydrochloric acid. They are readily decomposed in the acid solution merely by the application of heat to the latter and in so decomposing formaldehyde, ammonium chloride and ortho hydroxy diphenyl are liberated.

A corresponding reaction product of para hydroxy diphenyl and beta naphthylamine is prepared by dissolving equi-molar proportions of the two basic constituents in three or four parts of alcohol by the application of heat. Upon cooling this solution, the reaction product is deposited in the form of glistening white plates having a sharp melting point ranging from 130 to 131 degrees C. The yield of material thus obtained is approximately 67.5 percent of the theoretically possible value.

Para hydroxyl diphenyl likewise reacts with ethylene diamine in substantially the same manner as ortho hydroxy diphenyl. This reaction is preferably conducted in alcoholic solution at normal or room temperatures and under atmospheric pressures. The reaction product is obtained in the form of shining silvery white plates which are moderately soluble in alcohol and which melt at a temperature of 137 to 138 degrees C. Para hydroxy diphenyl also reacts with cyclo hexyl amine merely by adding the amine to an alcohol solution of para hydroxy diphenyl. This reaction, like most of the reactions which have previously been described, occurs at normal room temperatures and at atmospheric pressures. The reaction product crystallizes from the solution as a glistening white crystalline powder which melts at a temperature of 108 to 109 degrees C. The yield thus obtained is approximately 68.5 percent of the theoretical value. The behaviour of para hydroxy diphenyl toward hexamethylene tetramine is strictly analogous to that of ortho hydroxy diphenyl and the amine compound because, upon the addition of hexamethylene tetramine in water solution to an alcoholic solution of para hydroxy diphenyl at normal temperatures and pressures, a reaction product is obtained which crystallizes from the solution in the form of clear glassy white rhombohedra or needles which adhere together as clusters.

The same reaction product may also be obtained by the addition of formaldehyde to an ammoniacal solution of para hydroxy diphenyl in alcohol. The melting point of the resultant material in either case is approximately 152 degrees C. As has already been intimated, the reaction products thus obtained are in a relatively high state of purity. The reactions are also exceedingly simple in character and may be conducted without use of any special apparatus or any particular precautions in the regulation of the conditions under which the reactions occur. It is to be understood that the invention is not limited to the specific reaction products discussed, but also includes the reaction products of either para or ortho hydroxy diphenyl with numerous other amines or basic nitrogen containing bodies such as ethylamine, butylamine, benzylamine and aniline. Hydroxy diphenyl may also be caused to react with the amino derivative of hydroxy diphenyl which is obtained by the reduction of the nitro derivative of hydroxy diphenyl.

Although I have described the preferred forms of the invention, it will be apparent to those skilled in the art that the invention is not limited thereto, but that various modifications may be made therein without departing from the spirit of the invention or from the scope of the appended claims. It is intended that the patent shall cover, by suitable expression in the appended claims, whatever features of patentable novelty reside in the invention.

What I claim is:

1. The addition product of a mono hydroxy diphenyl and an amine of the group consisting of primary aliphatic mono- and diamines, primary aromatic mono amines of the benzene and naphthalene series, benzyl amine, cyclohexyl amine and hexamethylene tetra amine.
2. The addition product of a hydroxy diphenyl and a primary aliphatic diamine.
3. The addition product of a hydroxyl diphenyl and a primary aliphatic mono amine.
4. The addition product of a mono hydroxy diphenyl and a primary aliphatic mono amine.
5. The addition product of a mono hydroxy diphenyl and a primary aliphatic diamine.
6. The addition product of a mono hydroxy diphenyl and a primary aromatic mono amine of the benzene and naphthalene series.
7. The addition product of hydroxy diphenyl and beta naphthylamine.
8. The addition product of hydroxy diphenyl and ethylene diamine.
9. The addition product of hydroxy diphenyl and cyclohexyl amine.

WILLIAM D. WOLFE.